United States Patent [19]
Fraas

[11] Patent Number: 6,037,536
[45] Date of Patent: Mar. 14, 2000

[54] TPV FIREPLACE INSERT OR TPV INDOOR HEATING STOVE

[75] Inventor: Lewis M. Fraas, Issaquah, Wash.

[73] Assignee: JX Crystals Inc., Issaquah, Wash.

[21] Appl. No.: 09/280,660

[22] Filed: Mar. 29, 1999

Related U.S. Application Data

[60] Provisional application No. 60/080,155, Mar. 31, 1998.

[51] Int. Cl.$^7$ .................................................. H01L 31/101
[52] U.S. Cl. ........................... 136/253; 136/206; 136/246
[58] Field of Search ..................................... 136/253, 206, 136/246

[56] References Cited

U.S. PATENT DOCUMENTS

| 3,433,676 | 3/1969 | Stein ........................................ 136/253 |
| 3,751,303 | 8/1973 | Kittl ......................................... 136/89 |

(List continued on next page.)

FOREIGN PATENT DOCUMENTS

| 63-316486 | 12/1988 | Japan ............................. H01L 31/04 |

OTHER PUBLICATIONS

Fraas, A.P., "Heat Exchanger Design Operating on Radiant Energy," Wiley–Interscience Publication, pp. 365–382, (U. S. A. 1989).

Fraas, A.P., "Characteristics of Heat Sources, Engineering Evaluation of Energy System," pp. 96–125, McGraw–Hill (U. S. A. 1982).

Pelka, D.G. et al., "Natural Gas–Fired Thermophotovoltaic System,"0 Proceedings of the 32nd International Power Sources, pp. 110–123, (U.S.A. 1986).

Morgan, M.D. et al., "Radioisotope Thermal Photovoltaic Application of the GaSb Solar Cell," NASA SPRAT Conference, pp.349–358, (U.S.A. 1989).

Doellner, O.L., "Aircraft Photovoltaic Power–Generating System," PhD. Thesis (Appendix A), University of Arizona, (U.S.A. 1991).

Fraas, A.P., "Design and Development Tests of Direct–Condensing Potassium Radiators," USAEC Report Conf–651026, (U.S.A. 1965).

Fraas L. et al., "Status of TPV Commercial System Development Using GaSb Infrared Sensitive Cells," Presented at the Second World Photovoltaic Specialists Conference, Vienna, Austria, Jul. 6–10, 1998.

JX Crystals Sales Brochure, for Midnight Sun® Stove.

Whitaker, T., "GaSb Shines Brighter Than The Midnight Sun," Compound Semiconducter, Fall I, 1998, pp. 33–34.

*Primary Examiner*—Nam Nguyen
*Assistant Examiner*—Michael C. Miggins
*Attorney, Agent, or Firm*—James Creighton Wray; Meera P. Narasimhan

[57] ABSTRACT

The TPV generator unit insert has air circulation fans that supply air for both TPV cell cooling and heat transfer and room air circulation. Combustion air is supplied by a blower and mixed with natural gas or propane in a mixing chamber. Fuel and air mixing is enhanced by injecting the fuel counter to the air flow in an air supply tube within the mixing chamber. The fuel and air mixture is then injected into a combustion chamber and burned. The hot combustion gases then heat an IR emitter. Infrared radiation from the emitter is then incident on TPV cells, where electricity is produced. The hot by-product gases then transfer heat to the circulating room air in an upper plenum prior to exiting the room through the flue pipe. The yellow-orange glow from the emitter is visible through a front glass window, which then produces a very aesthetically pleasing effect. The rectangular unit is designed to include at least two cell panels at front and at the back. Each panel contains 40 cells and produces approximately 80 Watts. Each panel is approximately 2" high by 10" long. The unit then produces approximately 160 W for battery charging. The heat output is between 20,000 and 30,000 BTU per hour. The rectangular unit overall dimensions are 15" tall by 15" wide by 8" deep, though other dimensions and shapes are within the scope of this invention.

50 Claims, 2 Drawing Sheets

U.S. PATENT DOCUMENTS

| | | | |
|---|---|---|---|
| 4,234,352 | 11/1980 | Swanson | 136/253 |
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 4,976,606 | 12/1990 | Nelson | 431/79 |
| 5,044,939 | 9/1991 | Dehlsen | 432/25 |
| 5,080,724 | 1/1992 | Chubb | 136/253 |
| 5,091,018 | 2/1992 | Fraas et al. | 136/246 |
| 5,096,505 | 3/1992 | Fraas et al. | 136/246 |
| 5,118,361 | 6/1992 | Fraas et al. | 136/246 |
| 5,123,968 | 6/1992 | Fraas et al. | 136/246 |
| 5,217,539 | 6/1993 | Fraas et al. | 136/246 |
| 5,248,346 | 9/1993 | Fraas et al. | 136/244 |
| 5,281,131 | 1/1994 | Goldstein | 431/354 |
| 5,312,521 | 5/1994 | Fraas et al. | 136/253 |
| 5,383,976 | 1/1995 | Fraas et al. | 136/253 |
| 5,389,158 | 2/1995 | Fraas et al. | 136/244 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |
| 5,512,108 | 4/1996 | Noreen | 136/253 |
| 5,512,109 | 4/1996 | Fraas et al. | 136/253 |
| 5,551,992 | 9/1996 | Fraas | 136/253 |
| 5,560,783 | 10/1996 | Hamlen | 136/253 |
| 5,601,661 | 2/1997 | Milstein et al. | 136/253 |
| 5,616,186 | 4/1997 | Fraas et al. | 136/253 |
| 5,651,838 | 7/1997 | Fraas et al. | 136/253 |
| 5,772,793 | 6/1998 | Ashcroft et al. | 136/253 |
| 5,865,906 | 2/1999 | Ferguson et al. | 136/253 |

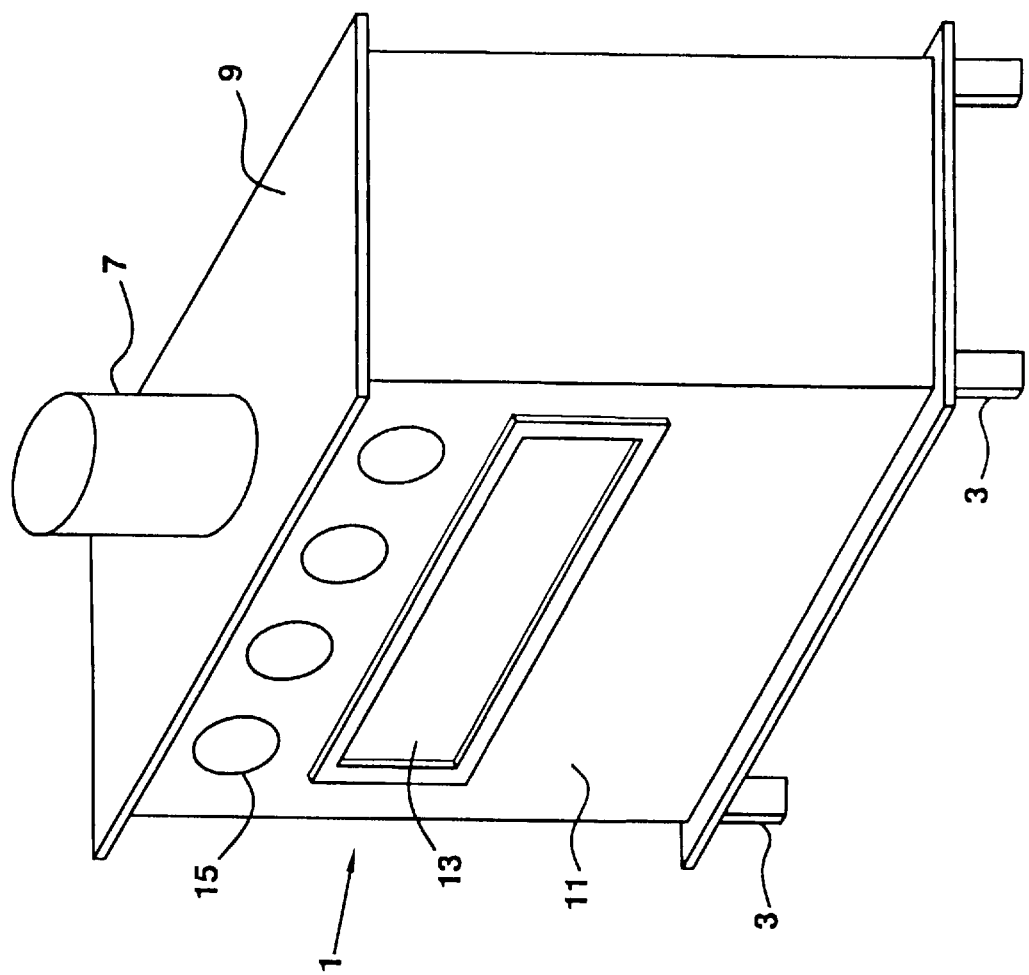

TPV FIREPLACE INSERT OR TPV INDOOR HEATING STOVE

This application claims the benefit of U.S. Provisional Application No. 60/080,155, filed Mar. 31, 1998.

BACKGROUND OF THE INVENTION

Solar photovoltaic modules with solar cells illuminated by sunlight to generate DC electric power have been in use. Recently thermophotovolatic (TPV) modules using GaSb infrared sensitive cells have been proposed.

However, there is a need for furnaces that cogenerate heat and electricity where TPV electricity is used to operate the furnaces in the event of power outages and for heat and electricity for families living in remote locations away from electric power grids.

SUMMARY OF THE INVENTION

We have previously described a thermophotovoltaic (TPV) cylindrical wall mounted microgenerator unit designed to produce approximately 40W of electricity and 8000 BTU/hr of heat. A scale-up version of this unit, preferably rectangular, may be used as a fire place insert or as an indoor heating stove. The preferred unit may have an emitter/filter/cell insert with a fan and blower assembly for, respectively, providing forced air circulation and for supplying combustion air to the burner. The insert is adaptable for use in stoves, with heating/electricity requirement for smaller areas (such as one or more rooms), and/or in furnaces for heating larger areas (entire home). The electricity produced is also sufficient to operate TVs, lamps, computers and security systems.

This new unit has air circulation fans that supply air for both TPV cell cooling and heat transfer and room air circulation. Combustion air is supplied by a blower and mixed with natural gas or propane in a mixing chamber. Fuel and air mixing is enhanced by injecting the fuel counter to the air flow in an air supply tube within the mixing chamber.

The fuel and air mixture is then injected into a combustion chamber and burned. The hot combustion gases then heat an IR emitter. Infrared radiation from the emitter is then incident on TPV cells, where electricity is produced. The hot by-product gases then transfer heat to the circulating room air in an upper plenum prior to exiting the room through the flue pipe. The yellow-orange glow from the emitter is visible through a front glass window, which then produces a very aesthetically pleasing effect.

The preferred new rectangular unit is designed to include at least two cell panels at front and at the back. Each panel preferably contains 40 cells and produces approximately 80 Watts. Each panel is preferably approximately 2" high by 10" long. The unit then preferably produces approximately 160 W for battery charging. The heat output is between 20,000 and 30,000 BTU per hour. The preferred rectangular unit overall dimensions are 15" tall by 15" wide by 8" deep, though other dimensions and shapes are within the scope of this invention.

The invention not only provides necessary heat and electricity to heat the room and power small appliances, it also prevents pipes from freezing in the event of prolonged power outages.

These and further and other objects and features of the invention are apparent in the disclosure, which includes the above and ongoing written specification, claims and drawings.

BRIEF DESCRIPTION OF THE DRAWINGS

FIG. 1 is a perspective view of a fireplace insert or indoor heating stove.

DETAILED DESCRIPTION OF THE PREFERRED EMBODIMENTS

Figure 3:
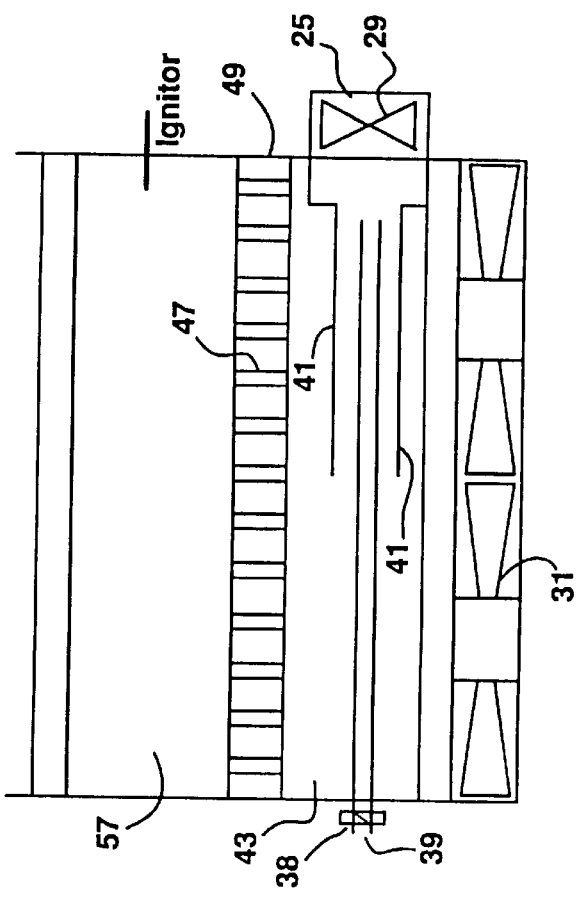
FIG. 3 is a sectional front view of the invention.
Figure 4:
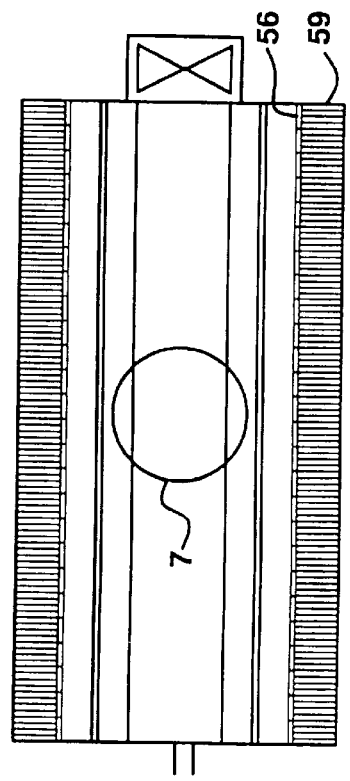
FIG. 4 is a sectional top view of the invention.
Figure 2:
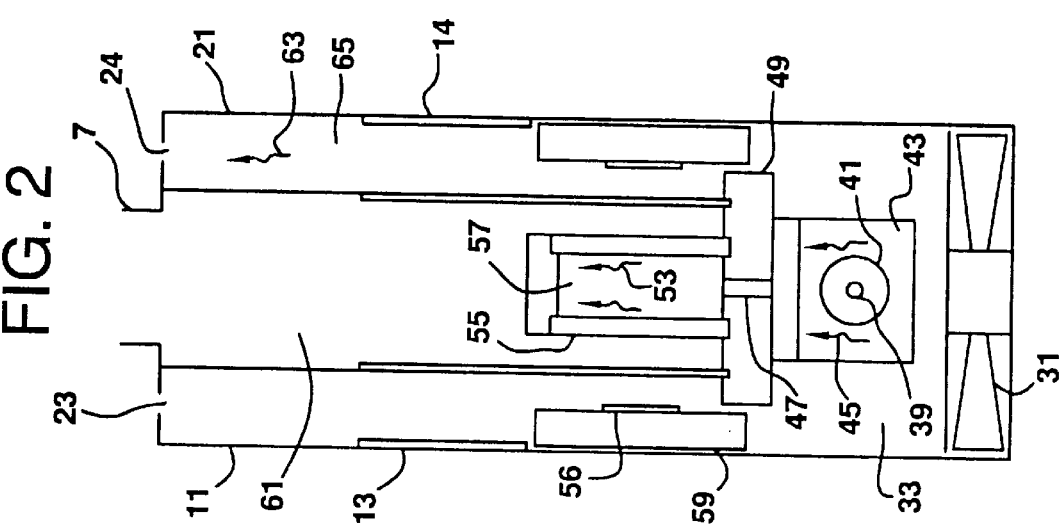
FIG. 2 is a sectional end view of the invention.

FIG. 1 shows the new stove or fireplace insert. FIGS. 2, 3 and 4 are sectional end, front and top views, respectively, which show the internal parts of the new unit.

The preferred unit 1 has legs 3, which support a rectangular body 5. A flue pipe 7 connects to the top 9 of the unit. The front face 11 has a window 13 through which combustion may be viewed. A similar window 14 (FIG. 2) may be located on the opposite face 21 when the stove 1 stands in a room outside of a fireplace. Front opening outlets 15 for heated air are shown in FIG. 1. FIG. 2 shows upper outlet vents 23, 24 for heated air, which may be advantageous when the stove is standing in a room.

Air circulation fans 31 supply air through chamber 33 for both TPV cell cooling and heat transfer, and room air circulation through outlet vents 23 and 24. Combustion air 25 is supplied by a blower 29 and is mixed with natural gas or propane fuel supplied by fuel source 39 in an air-supply or mixing tube 41 and mixing chamber 43. Control 38 controls fuel flow. Fuel and air mixing is enhanced by injecting the fuel 39 counter to the air flow in an air supply tube 41 within the mixing chamber 43. The fuel and air mixture 45 is then injected through channels 47 in a base 49 into a combustion chamber 57 and burned. The hot combustion gases 53 then heat an IR emitter 55.

Infrared from the emitter 55 is then incident on TPV cells 56, where electricity is produced. The TPV cells 56 are supported on cooling fins 59 along which the room air supply flows. The hot by-product gases 61 then transfer heat to the circulating room air 63 in an upper plenum 65 prior to exiting the room through flue pipe 7. The yellow-orange glow from the emitter 55 is visible through a front glass window, which then produces a very aesthetically pleasing effect.

The new rectangular unit 1 is designed to include at least two cell panels at the front and back of the unit. Each panel contains 40 cells and produces approximately 80 Watts. Each panel is approximately 2" high by 10" long. The unit then produces approximately 160 W for battery charging. The heat output is between 20,000 and 30,000 BTU per hour. The rectangular unit overall dimensions are 15" tall by 15" wide by 8" deep.

While the invention has been described with reference to specific embodiments, modifications and variations of the invention may be constructed without departing from the scope of the invention, which is defined in the following claims.

I claim:

1. An indoor heat and electricity generation apparatus comprising a housing, a thermophotovoltaic generator having a thermophotovoltaic converter assembly, circulation fans circulating indoor air, a fuel source connectable to the thermophotovoltaic converter assembly for supplying fuel, a control for regulating flow of fuel from the fuel source to the thermophotovoltaic converter assembly, an air blower for supplying combustion air, a mixing chamber for forming a fuel-air mixture by mixing the combustion air and fuel, a combustion chamber for combustion of the fuel-air mixture, an infrared emitter along the combustion chamber for emitting infrared radiation when heated by combustion gases resulting from combustion, a thermophotovoltaic cell receiver containing thermophotovoltaic cells positioned around the infrared emitter for receiving infrared radiation and for converting the infrared radiation to electric power, fins extending outward from the thermophotovoltaic cell receiver for cooling the thermophotovoltaic cells of the thermophotovoltaic receiver, and an exhaust chimney extending from a top of the combustion chamber for exhausting combustion gases.

2. The indoor heat and electricity generation apparatus of claim 1, wherein the housing is stove having plural supports.

3. The indoor heat and electricity generation apparatus of claim 2, wherein the stove is rectangular.

4. The indoor heat and electricity generation apparatus of claim 2, further comprising first and second faces on the housing and a window on at least one face.

5. The indoor heat and electricity generation apparatus of claim 1, the housing further comprising outlets for providing heated air.

6. The indoor heat and electricity generation apparatus of claim 1, the housing further comprising outlet vents for heated air.

7. The indoor heat and electricity generation apparatus of claim 1, wherein the circulation fans supply air through the housing for both TPV cell cooling and heat transfer.

8. The indoor heat and electricity generation apparatus of claim 1, wherein the fuel is supplied as a counter flow to the combustion air flow supplied by the blower for thoroughly mixing the fuel and air.

9. The indoor heat and electricity generation apparatus of claim 8, wherein the fuel is supplied in an air supply tube supplying the combustion air to the mixing chamber.

10. The indoor heat and electricity generation apparatus of claim 1, further comprising supply channels connecting the mixing chamber and combustion chamber for supplying the fuel-air mixture to the combustion chamber.

11. The indoor heat and electricity generation apparatus of claim 1, the combustion chamber further comprising an ignitor for igniting and burning the fuel-air mixture, for producing hot by-product gases, and for heating the infrared emitter.

12. The indoor heat and electricity generation apparatus of claim 11, further comprising infrared radiation from the infrared emitter being incident on the thermophotovoltaic cells for producing electricity.

13. The indoor heat and electricity generation apparatus of claim 12, further comprising cooling fins for supporting the thermophotovoltaic cells.

14. The indoor heat and electricity generation apparatus of claim 12, wherein the housing comprises an upper plenum for heat-exchange and heat transfer from hot by-product gases to indoor air provided as an updraft by the circulating fans.

15. The indoor heat and electricity generation apparatus of claim 12, wherein the infrared emitter provides a yellow-orange glow visible through a front glass window.

16. The indoor heat and electricity generation apparatus of claim 1, the thermophotovoltaic cell receiver further comprising at least two thermophotovoltaic cell panels on opposite sides of the housing.

17. The indoor heat and electricity generation apparatus of claim 16, wherein each thermophotovoltaic cell panel contains about 40 thermophotovoltaic cells.

18. The indoor heat and electricity generation apparatus of claim 16, wherein the thermophotovoltaic cell panels produce electricity in a range of about 80 to 160 Watts.

19. The indoor heat and electricity generation apparatus of claim 16, wherein each thermophotovoltaic panel is approximately 2" high by 10" long.

20. The indoor heat and electricity generation apparatus of claim 1, wherein heat output is between 20,000 and 30,000 BTU per hour.

21. The indoor heat and electricity generation apparatus of claim 3, wherein the housing has overall dimensions about 15" tall by 15" wide by 8" deep.

22. An indoor heat and electricity generation apparatus comprising a thermophotovoltaic generator insert having a thermophotovoltaic converter assembly, circulation fans circulating indoor air, a fuel source connectable to the thermophotovoltaic converter assembly for supplying fuel, an air blower for supplying combustion air, a mixing chamber for forming a fuel-air mixture by mixing the combustion air and fuel, a combustion chamber for combustion of the fuel-air mixture, an infrared emitter along the combustion chamber for emitting infrared radiation when heated by combustion gases resulting from the combustion, a thermophotovoltaic cell receiver positioned around the infrared emitter for receiving infrared radiation and for converting the infrared radiation to electric power, fins extending outward from the thermophotovoltaic receiver containing thermophotovoltaic cells for cooling the thermophotovoltaic cells of the thermophotovoltaic receiver, and a flue pipe extending from a top of the combustion chamber for exhausting combustion gases.

23. The indoor heat and electricity generation apparatus of claim 22, further comprising a control for regulating flow of fuel from the fuel source to the thermophotovoltaic converter assembly.

24. The indoor heat and electricity generation apparatus of claim 22, wherein the circulation fans supply air for both thermophotovoltaic cell cooling and for heat transfer.

25. The indoor heat and electricity generation apparatus of claim 22, wherein fuel is supplied as a counter flow to a combustion air flow supplied by the air blower for thoroughly mixing the fuel and combustion air.

26. The indoor heat and electricity generation apparatus of claim 25, wherein the fuel is supplied in an air supply tube supplying the combustion air to the mixing chamber.

27. The indoor heat and electricity generation apparatus of claim 22, further comprising supply channels connecting the mixing chamber and combustion chamber for supplying the fuel-air mixture to the combustion chamber.

28. The indoor heat and electricity generation apparatus of claim 22, the combustion chamber further comprising an ignitor for igniting and burning the fuel-air mixture, for producing hot by-product gases, and for heating the infrared emitter.

29. The indoor heat and electricity generation apparatus of claim 28, further comprising infrared radiation from the infrared emitter being incident on the thermophotovoltaic cells for producing electricity.

30. The indoor heat and electricity generation apparatus of claim 29, further comprising cooling fins for supporting the thermophotovoltaic cells.

31. The indoor heat and electricity generation apparatus of claim 29, wherein the infrared emitter provides a visible yellow-orange glow.

32. The indoor heat and electricity generation apparatus of claim 22, the thermophotovoltaic cell receiver further comprising at least two thermophotovoltaic cell panels on opposite sides of the housing.

33. The indoor heat and electricity generation apparatus of claim 32, wherein each thermophotovoltaic cell panel contains about 40 thermophotovoltaic cells.

34. The indoor heat and electricity generation apparatus of claim 32, wherein the thermophotovoltaic cell panels produce electricity in a range of about 80 to 160 Watts.

35. The indoor heat and electricity generation apparatus of claim 32, wherein each panel is about 2" high by 10" long.

36. The indoor heat and electricity generation apparatus of claim 22, wherein heat output is between 20,000 and 30,000 BTU per hour.

37. The indoor heat and electricity generation apparatus of claim 22, further comprising a furnace for receiving the thermophotovoltaic generator insert.

38. The indoor heat and electricity generation apparatus of claim 22, further comprising a stove for receiving the thermophotovoltaic generator insert.

39. A method of indoor heat and electricity generation comprising generating heat and electricity by providing a thermophotovoltaic generator insert having a thermophotovoltaic converter assembly for circulating indoor air with circulation fans, supplying fuel source through a fuel source connectable to the thermophotovoltaic converter assembly, supplying combustion air by means of an air blower, forming a fuel-air mixture by mixing the combustion air and fuel in a mixing chamber, combusting the fuel-air mixture in a combustion chamber and producing hot combustion gases for heating an infrared emitter positioned along the combustion chamber, the infrared emitter emitting infrared radiation when heated by combustion gases, providing infrared radiation to a thermophotovoltaic cell receiver containing thermophotovoltaic cells positioned around the infrared emitter for converting the infrared radiation to electric power, cooling the thermophotovoltaic receiver by means of fins extending outward from the thermophotovoltaic receiver, and exhausting combustion gases through a flue pipe connected to the combustion chamber.

40. The indoor heat and electricity generation method of claim 39, wherein the circulation fans supply air for both thermophotovoltaic cell cooling and for heat transfer.

41. The indoor heat and electricity generation method of claim 39, wherein supplying fuel comprises counter flowing fuel to a flow of the combustion air supply and thoroughly mixing the fuel and air, and further mixing the fuel and air in the mixing chamber.

42. The indoor heat and electricity generation method of claim 39, wherein supplying the fuel-air mixture to the combustion chamber comprises supplying from the mixing chamber via channels to the combustion chamber.

43. The indoor heat and electricity generation method of claim 39, further comprising igniting the fuel-air mixture in the combustion chamber further by an ignitor, burning the fuel-air mixture, producing hot by-product gases and heating the infrared emitter.

44. The indoor heat and electricity generation method of claim 43, further comprising providing infrared radiation from the infrared emitter to be incident on the thermophotovoltaic cells and producing electricity.

45. The indoor heat and electricity generation method of claim 44, further comprising cooling the thermophotovoltaic cells by means of supporting fins.

46. The indoor heat and electricity generation method of claim 39, further comprising providing the thermophotovoltaic generator insert in a furnace for indoor heating.

47. The indoor heat and electricity generation method of claim 39, further comprising placing the thermophotovoltaic generator insert in a stove for indoor heating.

48. The indoor heat and electricity generation apparatus of claim 1, wherein the thermophotovoltaic cells are GaSb cells.

49. The indoor heat and electricity generation apparatus of claim 22, wherein the thermophotovoltaic cells are GaSb cells.

50. The indoor heat and electricity generation method of claim 39, wherein the thermophotovoltaic cells are GaSb cells.

* * * * *